United States Patent
Johnson Premkumar et al.

(10) Patent No.: US 11,113,481 B2
(45) Date of Patent: Sep. 7, 2021

(54) ADAPTING AUTOMATED ASSISTANTS FOR USE WITH MULTIPLE LANGUAGES

(71) Applicant: GOOGLE LLC, Mountain View, CA (US)

(72) Inventors: Melvin Jose Johnson Premkumar, Mountain View, CA (US); Vladimir Vuskovic, Mountain View, CA (US); James Kuczmarski, Mountain View, CA (US); Hongjie Chai, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 53 days.

(21) Appl. No.: 16/621,578

(22) PCT Filed: May 2, 2019

(86) PCT No.: PCT/US2019/030343
§ 371 (c)(1),
(2) Date: Dec. 11, 2019

(87) PCT Pub. No.: WO2020/222846
PCT Pub. Date: Nov. 5, 2020

(65) Prior Publication Data
US 2021/0064828 A1    Mar. 4, 2021

(51) Int. Cl.
*G06F 40/58* (2020.01)
*G06F 40/30* (2020.01)
(Continued)

(52) U.S. Cl.
CPC ............. *G06F 40/58* (2020.01); *G06F 40/30* (2020.01); *G06F 40/51* (2020.01); *G10L 15/063* (2013.01); *G10L 15/22* (2013.01); *G10L 19/008* (2013.01)

(58) Field of Classification Search
CPC .......... G06F 40/30; G06F 40/58; G06N 3/08; G06N 3/0454; G06N 3/084
See application file for complete search history.

(56) References Cited

U.S. PATENT DOCUMENTS

| 8,583,416 | B2 | 11/2013 | Huang et al. |
| 10,867,136 | B2 * | 12/2020 | Lee .......................... G06F 40/56 |

(Continued)

FOREIGN PATENT DOCUMENTS

WO    2017112813 A1    6/2017

OTHER PUBLICATIONS

Shi, Chen, et al. "Knowledge-based semantic embedding for machine translation." Proceedings of the 54th Annual Meeting of the Association for Computational Linguistics (vol. 1: Long Papers). 2016. (Year: 2016).*

(Continued)

*Primary Examiner* — Jialong He
(74) *Attorney, Agent, or Firm* — Middleton Reutlinger

(57) ABSTRACT

Techniques described herein may serve to increase the language coverage of an automated assistant system, i.e. they may serve to increase the number of queries in one or more non-native languages for which the automated assistant is able to deliver reasonable responses. For example, techniques are described herein for training and utilizing a machine translation model to map a plurality of semantically-related natural language inputs in one language to one or more canonical translations in another language. In various implementations, the canonical translations may be selected and/or optimized for determining an intent of the speaker by the automated assistant, so that one or more responsive actions can be performed based on the speaker's intent. Put another way, the canonical translations may be specifically formatted for indicating the intent of the speaker to the automated assistant.

13 Claims, 8 Drawing Sheets

(51) Int. Cl.
*G06F 40/51* (2020.01)
*G10L 15/06* (2013.01)
*G10L 15/22* (2006.01)
*G10L 19/008* (2013.01)

(56) References Cited

U.S. PATENT DOCUMENTS

| | | | |
|---|---|---|---|
| 10,891,435 B1* | 1/2021 | Ruiz | G06F 40/30 |
| 2001/0029455 A1 | 10/2001 | Chin et al. | |
| 2003/0144832 A1 | 7/2003 | Harris | |
| 2014/0205974 A1 | 7/2014 | Pellom et al. | |
| 2018/0314689 A1* | 11/2018 | Wang | G10L 15/22 |
| 2019/0138606 A1* | 5/2019 | Tu | G06F 40/49 |

OTHER PUBLICATIONS

Song, Linfeng, et al. "Semantic neural machine translation using AMR." Transactions of the Association for Computational Linguistics 7 (Mar. 1, 2019): 19-31. (Year: 2019).*

Schwenk, Holger, and Matthijs Douze. "Learning joint multilingual sentence representations with neural machine translation." arXiv preprint arXiv:1704.04154 (2017). (Year: 2017).*

Wu, Yonghui, et al. "Google's neural machine translation system: Bridging the gap between human and machine translation." arXiv preprint arXiv:1609.08144 (2016). (Year: 2016).*

Dong, Daxiang, et al. "Multi-task learning for multiple language translation." Proceedings of the 53rd Annual Meeting of the Association for Computational Linguistics and the 7th International Joint Conference on Natural Language Processing (vol. 1: Long Papers). 2015. (Year: 2015).*

Luong, M. et al., "Multi-Task Sequence to Sequence Learning"; retrieved from Internet: URL:https://arxiv.org/pdf/1511.06114.pdf; dated Mar. 1, 2016. 10 pages.

Lee et al., "Fully Character-Level Neural Machine Translation without Explicit Segmentation" Association for Computational Linguistics, vol. 5, pp. 365-378. Published Oct. 2017. 14 pages.

Koehn "Neural Machine Translation" Center for Speech and Language Processing Department of Computer Science Johns Hopkins University 2017. 133 pages.

European Patent Office; Invitation to Pay Fees of Ser. No. PCT/US2019/030343; dated Oct. 4, 2019. 13 pages.

European Patent Office; International Search Report and Written Opinion of Ser. No. PCT/US2019/030343; 18 pages; dated Dec. 3, 2019.

\* cited by examiner

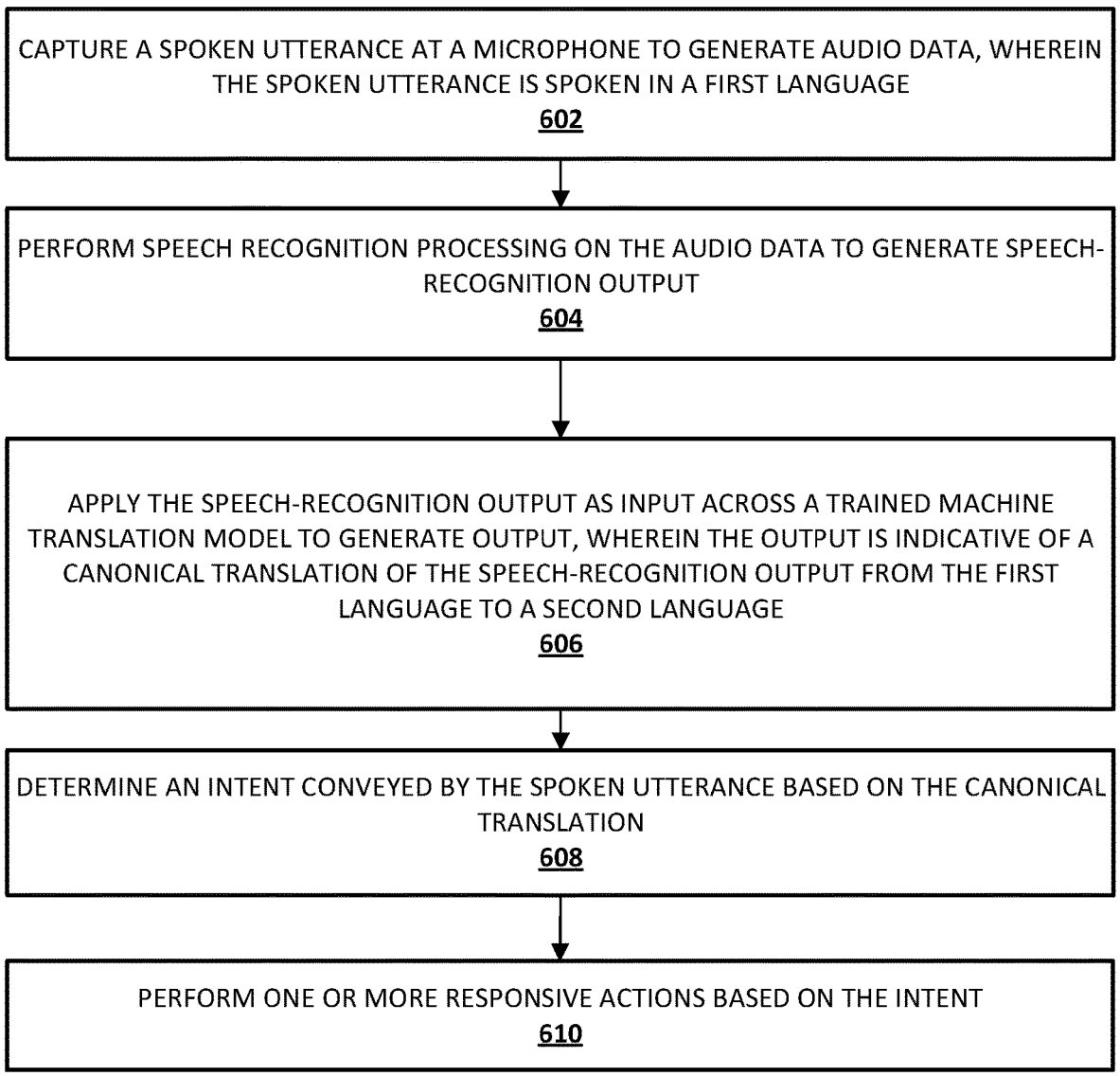

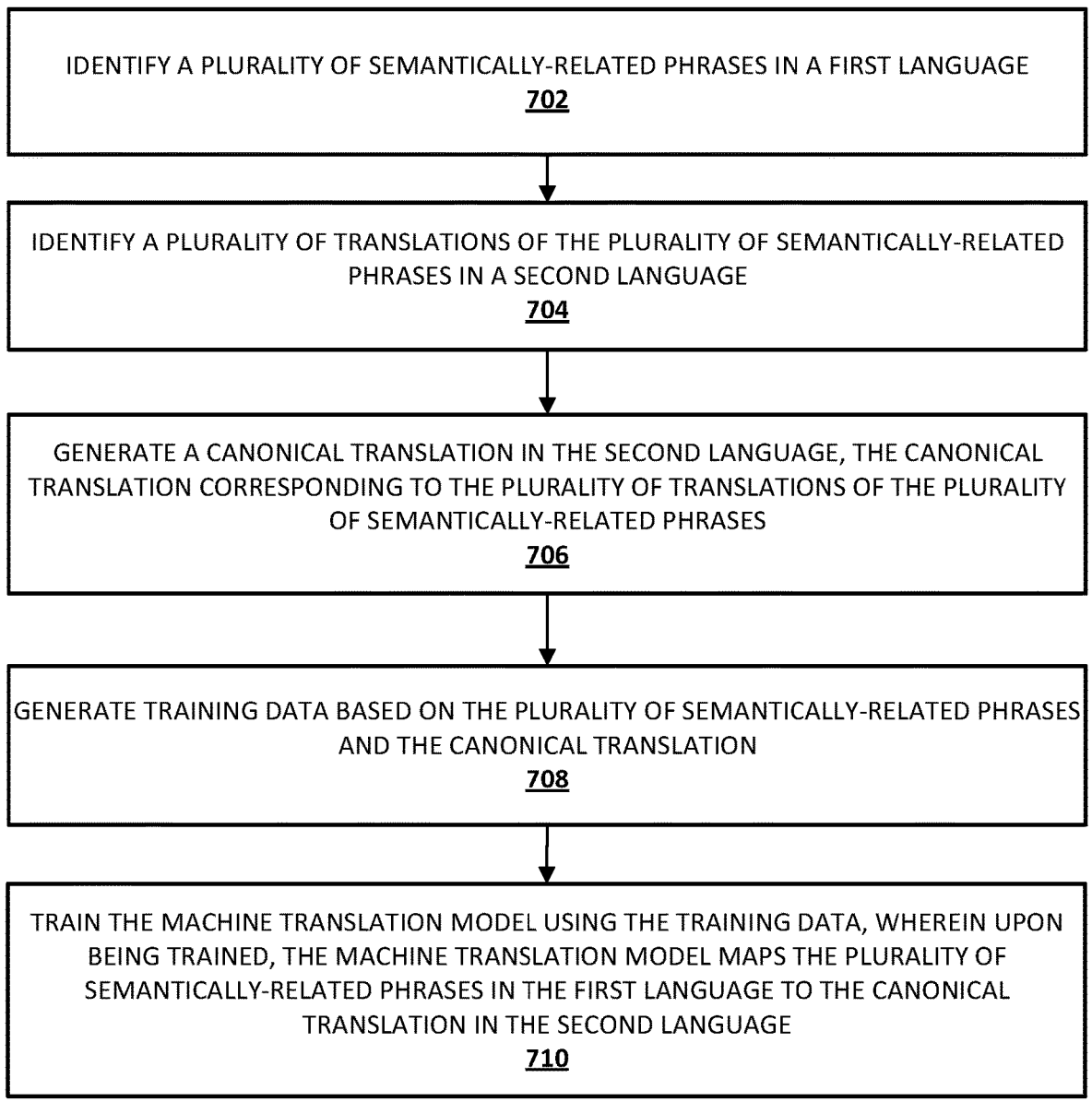

ADAPTING AUTOMATED ASSISTANTS FOR USE WITH MULTIPLE LANGUAGES

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using free form natural language input which may be vocal utterances converted into text and then processed, and/or typed free form natural language input. Automated assistants are typically invoked using predetermined vocal utterances (e.g., "OK Assistant") and often perform various types of processing, such as speech-to-text processing and/or natural language processing, only on those vocal utterances that follow an invocation phrase.

Automated assistants are adept at communicating with users in some widely-used languages, such as English, but are less able to communicate in other languages. However, conventional techniques for configuring automated assistants to communicate in new languages are resource-intensive. For each new language, it may be necessary to generate new trigger grammars (i.e., words or phrases intended to invoke a particular action by the automated assistant), recognize query intents in the new language (which require different natural language processing components for different languages), and to generate natural language output that is comprehensible in the new language. Adding to the challenge, each language has myriad idiosyncrasies (e.g., morphologically rich, pro-drop, gender neutrality, etc.) and language experts who can build these systems in particular languages may be hard to find.

SUMMARY

Techniques described herein relate in part to multilingual models that automated assistants to interpret and respond to queries, commands, and requests in multiple different languages, beyond a "native" language of the automated assistant. Techniques described herein may also serve to increase the language coverage of an automated assistant system, i.e. they may serve to increase the number of queries in one or more non-native languages for which the automated assistant is able to deliver reasonable responses.

Some implementations are described herein for training and utilizing a machine translation model to map a plurality of semantically-related natural language inputs in one language to one or more canonical translations in another language. In various implementations, the canonical translations may be selected and/or optimized for determining an intent of the speaker by the automated assistant, so that one or more responsive actions can be performed based on the speaker's intent. Put another way, the canonical translations may be specifically formatted for indicating the intent of the speaker to the automated assistant. While example described herein will primarily relate to multiple speech inputs in one language being speech recognized and mapped to a single canonical translation in another language, this is not meant to be limiting. Techniques described herein may be applicable to unspoken natural language input, such as typed natural language input.

In various implementations, a spoken utterance may be captured, e.g., by one or more microphones, to generate audio data. The audio data may take various forms, such as an audio recording, an embedding generated based on the spoken utterance, etc. The spoken utterance may be in a first language that may not be natively supported by an automated assistant, or that at least may not be as well supported by the automated assistant as a second language.

In some implementations, speech-recognition processing may be performed on the audio data to generate speech-recognition output. Speech-recognition output may take various forms, such as text, a semantic embedding, etc. The speech-recognition output may be applied as input across a trained machine translation model to generate output. The output generated based on the machine translation model may be indicative of a canonical translation of the speech-recognition output from the first language to the second language. Based on the canonical translation, an intent conveyed by the spoken utterance may be determined and used to trigger one or more responsive actions by the automated assistant.

In various implementations, the machine translation model may be trained to map a plurality of semantically-related phrases in the first language to the same canonical translation in the second language. The canonical translation may vary syntactically from at least some of the plurality of semantically-related phrases. In other words, at least some of the plurality of semantically-related phrases in the first language will no longer be mapped to their "true" or strict translations in the second language. Instead they may be mapped by the machine translation model to canonical translations in the second language. However, the canonical translations may be selected or optimized for use in the automated assistant domain. Consequently, language coverage for the first language—i.e. the number of queries in the first language for which the automated assistant is able to deliver reasonable responses—may be increased. This may increase the utility of automated assistant systems and may decrease the number of instances of (and the computational resource use associated with) the automated assistant system being unable to handle a query received in a particular, non-native language.

Suppose the first language not natively supported by the automated assistant is German, and that the second language natively supported by the automated assistant is English. There may be several different German phrases that convey the intent of setting an alarm in the morning. Each of these German phrases may, when translated using a conventional machine translation model, generate a slightly different English translation than the others. Put another way, a conventional machine translation model may impose a many-to-many relationship between the various German phrases and English translations thereof. However, it may be the case that only a subset of the English translations are easily mapped by an automated assistant to the intent of setting an alarm. The English translations outside of this subset—which may be "long tail" or less common ways of conveying the intent of setting an alarm—may be more difficult for an automated assistant to respond to confidently and/or without seeking additional input from the user.

A machine translation model trained in accordance with the present disclosure may instead impose a many-to-one, or at least a many-to-fewer, relationship between the various German phrases and one or more canonical English translations. In some implementations, these one or more canonical English translations may be directly mapped to structured intents, in some cases with as little as a one-to-one mapping between the canonical translation and the structured intent. Put another way, a machine translation model trained accordance to the present disclosure may normalize a plurality of different translations of a plurality of semantically-related phrases into one or more canonical translations. As a consequence, any of the semantically-related phrases may be mapped to the one or more canonical translations, notwithstanding how they might be translated using a conventional machine translation model or naturally by a human translator.

In various implementations, a machine translation model configured with selected aspects of the present disclosure may be a sequence-to-sequence model such as a recurrent neural network. In some implementations, the machine translation model may be a sequence-to-sequence model such as an encoder-decoder model, sometimes referred to as an "autoencoder," that includes an encoder portion and a decoder portion. The encoder portion may be trained to map data indicative of words or phrases in a first language to an embedding in language-neutral semantic space. The decoder portion may be trained to map embeddings in the semantic space to words or phrases in a second language.

In some implementations, the machine translation model may start as a conventional encoder-decoder model that is then optimized for use in the automated assistant domain. For example, the conventional encoder-decoder may be further trained using training data in which the target outputs (i.e., the desired word or phrase to be generated by the decoder portion) are rewritten in order to tune the machine translation model to map multiple semantically-related phrases to the same canonical translation.

As an example, suppose there are N (positive integer greater than one) different ways to convey a particular intent in German, and that these N phrases map to M (positive integer greater than one) different respective translations in English if traditional translation is applied. In some implementations, at least N training examples may be generated, at least one training example for each different German phrase. The target outputs of each of these N training examples may be rewritten from the traditional translations to one canonical translation. As noted previously, this one canonical translation may have a one-to-one relationship with a structured intent that is well-understood by the automated assistant.

The training data may then be used to further train the machine translation model. With each training example, the output generated by the model may be compared to the canonical translation. To the extent the output and the canonical translation differ (i.e., the error), techniques such as back propagation and/or gradient descent may be applied to adjust parameters of the machine translation model. Once a sufficient number of training examples are utilized in this manner, the machine translation model may be trained to map multiple semantically-related German phrases to the same canonical translation.

In some implementations in which the machine translation model is an encoder-decoder, a decoder portion may be trained to map multiple outputs of an encoder portion—e.g., one or more semantic embeddings representing a plurality of semantically-related phrases in a first language—to the same canonical translation. In some such implementations, the decoder portion may be trained to map an entire cluster of semantic embeddings to the same canonical translation, such that any individual embedding of the cluster is mapped to the canonical translation regardless of what its "true" or strict translation would be. Additionally or alternatively, in some implementations, an encoder portion of the encoder-decoder may be trained to map a plurality of semantically-related phrases in the first language to a lower number of semantic embeddings than would otherwise be mapped with a conventional machine translation model. These fewer semantic embeddings may in turn be mapped to canonical translation(s).

Techniques described herein may be applicable to machine translation models that are trained to translate from more than one language to a natively supported language. For example, multiple encoders may be trained, one for each language other than the natively-supported language. Each encoder may generate semantic embeddings from input in a respective language. In some implementations, these semantic embeddings may be language neutral. For example, the same (or substantially similar) semantic embedding may be generated by a French encoder based on a French utterance as a German encoder based on a semantically-similar German utterance. A single decoder portion may then be used to process semantic embeddings generated by any of the encoders. As described above, the single decoder may map the semantic embeddings to canonical translations.

In some examples, a final performance of the model may be improved using multi-task training. More specifically, the decoder portion may additionally receive embeddings generated by an additional encoder that is trained to map semantically-related phrases received in the second, natively-supported language to semantic embeddings. The semantic embeddings generated by the additional encoder may then be processed by the decoder portion in the manner described above.

There are various ways to generate training data used to train machine translation models in accordance with the present disclosure. In some implementations, one or more canonical phrases may be selected for a given responsive action, such as setting an alarm, setting a reminder, etc. These canonical phrases may be selected, for instance, based on being the most frequent or popular phrases used to identify structured intents that are mapped to responsive actions. For example, users may convey the intent to set an alarm at a particular <time> in several ways: "set an alarm for <time>," "please wake me up at <time>," "I need an alarm set for <time>," "at <time> please wake me up," etc. However, one of these phrases, such as "set an alarm for <time>," may be the most frequently used. Accordingly, that phrase may be selected as the canonical translation to which multiple different semantically-related phrases in other languages may be mapped, regardless of those phrases' "true" translations.

In some implementations, a method performed by one or more processors is provided that includes: capturing a spoken utterance at a microphone to generate audio data, wherein the spoken utterance is spoken in a first language; performing speech recognition processing on the audio data to generate speech-recognition output; applying the speech-recognition output as input across a trained machine translation model to generate output, wherein the output is indicative of a canonical translation of the speech-recognition output from the first language to a second language; determining an intent conveyed by the spoken utterance based on the canonical translation; and performing one or more responsive actions based on the intent. In various implementations, the machine translation model is trained to map a plurality of semantically-related phrases in the first language to the same canonical translation, wherein the canonical translation varies syntactically from at least some of the plurality of semantically-related phrases.

These and other implementations of technology disclosed herein may optionally include one or more of the following features.

In various implementations, the machine translation model may take the form of a sequence-to-sequence model. In various implementations, the machine translation model may take the form of an encoder-decoder. In various implementations, a decoder portion of the encoder-decoder is trained to map one or more semantic embeddings representing the plurality of semantically-related phrases in the first language to the same canonical translation. In various implementations, an encoder portion of the encoder-decoder is trained to map the plurality of semantically-related phrases in the first language to a fewer number of semantic embeddings.

In various implementations, the method may further include: capturing another spoken utterance at the same microphone or a different microphone to generate additional audio data, wherein the another spoken utterance is spoken in a third language; performing speech recognition processing on the additional audio data to generate additional speech-recognition output; applying the additional speech-recognition output as input across the trained machine translation model to generate additional output, wherein the additional output is indicative of the canonical translation of the speech-recognized text; determining an intent conveyed by the another spoken utterance based on the canonical translation; and performing one or more additional responsive actions based on the intent. In some such implementations, the machine translation model may be trained to map a plurality of semantically-related phrases in the third language to the same canonical translation, wherein the canonical translation varies syntactically from at least some of the plurality of semantically-related phrases in the third language.

In various implementations, the intent may be determined based on a mapping between the canonical translation and the intent. In various implementations, determining the intent may include performing natural language processing on the canonical translation to determine the intent. In some implementations, the trained machine translation module includes a word piece vocabulary that is shared across multiple languages.

In another aspect, a method implemented using one or more processors may include: identifying a plurality of semantically-related phrases in a first language; identifying a plurality of translations of the plurality of semantically-related phrases in a second language; generating a canonical translation in the second language, the canonical translation corresponding to the plurality of translations of the plurality of semantically-related phrases; generating training data based on the plurality of semantically-related phrases and the canonical translation; and training the machine translation model using the training data, wherein upon being trained, the machine translation model maps the plurality of semantically-related phrases in the first language to the canonical translation in the second language. In various implementations, prior to being trained, the machine learning model may have mapped the plurality of semantically-related phrases in the first language to the plurality of translations in the second language.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 depicts a flowchart illustrating an example method according to implementations disclosed herein.

FIG. 7 depicts a flowchart illustrating another example method according to implementations disclosed herein.

DETAILED DESCRIPTION

Figure 1:
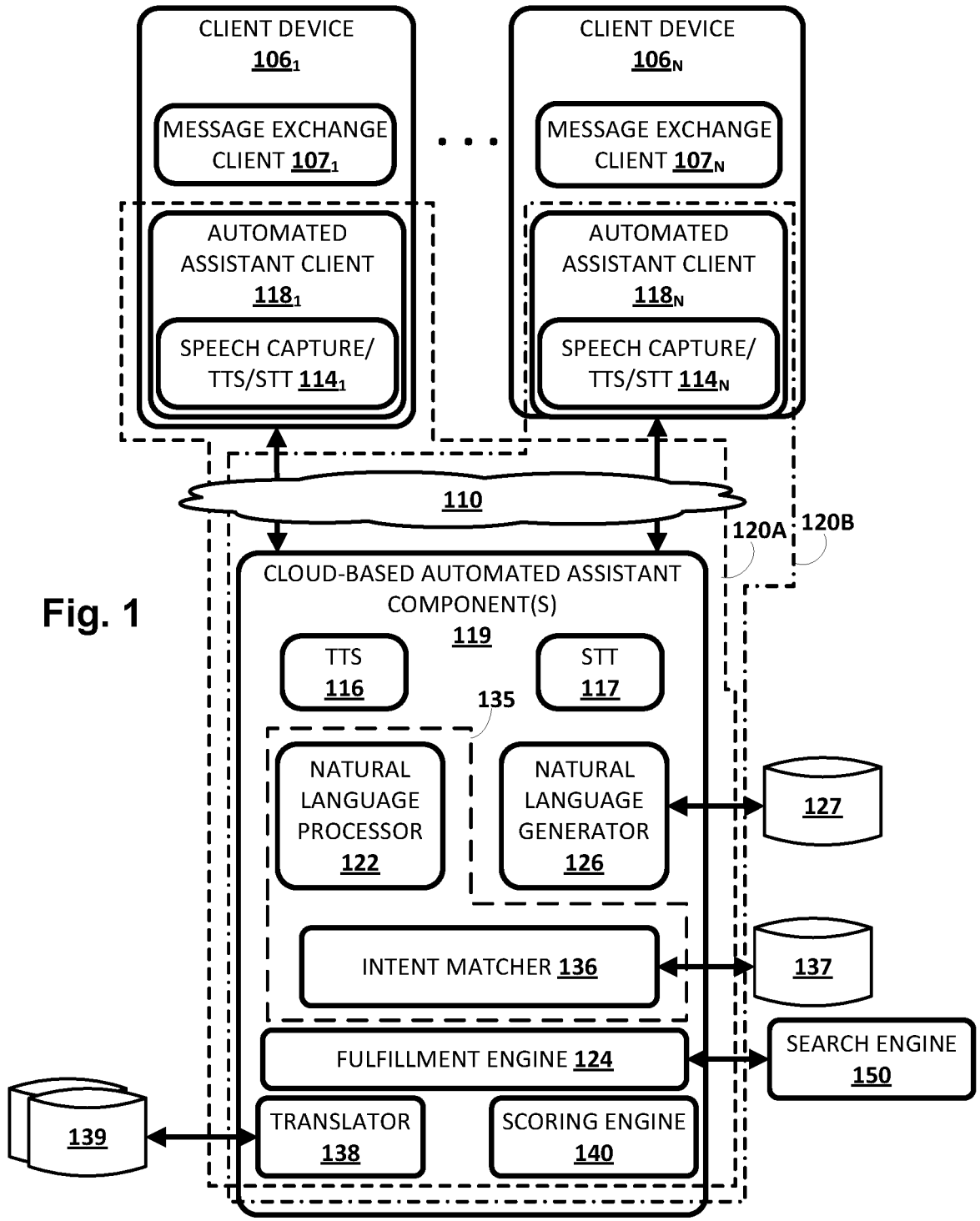
FIG. 1 is a block diagram of an example environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, the plurality of client computing devices $106_{1-N}$ (also referred to herein simply as "client devices") may be associated with each other in various ways in order to facilitate performance of techniques described herein. For example, in some implementations, plurality of client computing devices $106_{1-N}$ may be associated with each other by virtue of them being members of a coordinated ecosystem of client devices 106 that are operated by one or more users (e.g., an individual, a family, employees of an organization, other predefined groups, etc.).

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119.

A second automated assistant 120B encompassed by a dash-dash-dot line serves a second user (not depicted)

operating another client device $106_N$ and includes automated assistant client $118_N$ and one or more cloud-based automated assistant components 119. It thus should be understood that each user that engages with an automated assistant client 118 executing on a client device 106 may, in effect, engage with his or her own logical instance of an automated assistant 120. For the sake of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a human-to-computer dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, the user may utter commands, searches, etc., and the automated assistant may utilize speech recognition to convert the utterances into text, and respond to the text accordingly, e.g., by providing search results, general information, and/or taking one or more responsive actions (e.g., playing media, launching a game, ordering food, etc.). In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various implementations, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. In various implementations, speech capture/TTS/STT module 114 may generate speech recognition output based on a vocal query. This speech recognition output may be analyzed pursuant to techniques described herein.

Each speech capture/TTS/STT module 114 may be configured to perform one or more functions: capture a user's speech, e.g., via a microphone; convert that captured audio to text (and/or to other representations or embeddings) using various speech recognition techniques; and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122) using various speech recognition techniques. Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, to protect privacy, one or more of the components of automated assistant 120, such as natural language processor 122, speech capture/TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and one or more (e.g., all) of the terms of the natural language input.

In some implementations, the natural language processor 122 is configured to identify and annotate various types of grammatical information in natural language input. For example, the natural language processor 122 may include a morphological engine that may separate individual words into morphemes and/or annotate the morphemes, e.g., with their classes. Natural language processor 122 may also include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

Natural language understanding engine 135 may also include an intent matcher 136 that is configured to determine an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user, e.g., based on output from natural language processor 122 (which may include annotations and terms of the natural language input). In some implementations, intent matcher 136 may have access to one or more databases 137 that include, for instance, a plurality of mappings between grammars and responsive actions, or more generally, intents. In many cases, these grammars may be selected and/or learned over time, and may represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As will be described in more detail below, in addition to or instead of grammars, in some implementations, intent matcher 136 may employ one or more trained machine learning models, alone or in combination with one or more grammars. These trained machine learning models may also be stored in one or more databases 137.

As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In some implementations, automated assistant 120 may facilitate (or "broker") transactions between users and third party applications. These third party applications may or may not operate on computing systems that are separate from those that operate, for instance, cloud-based automated assistant components 119. Accordingly, one kind of user intent that may be identified by intent matcher 136 is to engage a third party application. For example, automated assistant 120 may provide access to an application programming interface ("API") to a pizza delivery service. A user may invoke automated assistant 120 and provide a command such as "I'd like to order a pizza." Intent matcher 136 may map this command to a grammar (which may be added to database 137 in some cases by the third party) that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 106) natural language output that solicits parameters for the slots.

Fulfillment engine 124 may be configured to receive the intent output by intent matcher 136, as well as an associated slot values (whether provided by the user proactively or solicited from the user) and fulfill the intent. In various implementations, fulfillment of the user's intent may cause various fulfillment information (which may be language-agnostic in some instances) to be generated/obtained, e.g., by fulfillment engine 124. As will be described below, the fulfillment information may in some implementations be provided to a natural language generator ("NLG" in some FIGS.) 126, which may generate natural language output based on the fulfillment information.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 136, as being a search query. The intent and content of the search query may be provided to fulfillment engine 124, which as depicted in FIG. 1 may be in communication with one or more search engines 150 configured to search corpuses of documents and/or other data sources (e.g., knowledge graphs, etc.) for responsive information. Fulfillment engine 124 may provide data indicative of the search query (e.g., the text of the query, a reduced dimensionality embedding, etc.) to search engine 150. Search engine 150 may provide responsive information, such as GPS coordinates, or other more explicit information, such as "Timberline Lodge, Mt. Hood, Oreg." This responsive information may form part of the fulfillment information generated by fulfillment engine 124.

Additionally or alternatively, fulfillment engine 124 may be configured to receive, e.g., from natural language understanding engine 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, etc. In some such implementations, fulfillment information may include slot values associated with the fulfillment, confirmation responses (which may be selected from predetermined responses in some cases), etc.

As noted above, natural language generator 126 may be configured to generate and/or select natural language output (e.g., spoken words/phrases that are designed to mimic human speech) based on data obtained from various sources.

In some implementations, natural language generator 126 may be configured to receive, as input, fulfillment information associated with fulfillment of an intent, and to generate natural language output based on the fulfillment information. Additionally or alternatively, natural language generator 126 may receive information from other sources, such as third party applications (e.g., required slots), which it may use to compose natural language output for the user.

If a user's intent is to search for general information, then natural language generator 126 may generate natural language output that conveys information responsive to the user's, e.g., in sentence form. In some instances, the natural language output may be extracted, e.g., by natural language generator 126, unaltered from documents (e.g., because it is already in complete sentence form) and provided as is. Additionally or alternatively, in some implementations, the responsive content may not be in complete sentence form (e.g., a request for today's weather may include a high temperature and chance of precipitation as standalone pieces of data), in which case natural language generator 126 may compose one or more complete sentences or phrases which presents the responsive content as natural language output.

As noted in the background, automated assistants are adept at communicating with users in some widely-used languages, such as English. This may be for a variety of reasons, such as the automated assistants being developed in countries in which English is the most commonly-spoken language. However, automated assistants may be less adept at communicating with users in other languages. Every language has myriad idiosyncrasies that make adapting automated assistant 120 for communication in those language difficult, often requiring substantial human intervention by language experts. Moreover, third party application developers may lack the resources to adapt their systems for communication in multiple languages.

In the human-to-computer dialog domain, the vocabulary employed by users and by automated assistant 120 may be somewhat less comprehensive and/or more constrained than what is employed in everyday conversation, literature, writing, etc. In other words, a limited language space employed during human-to-computer dialogs is typically going to be a subset of a more comprehensive language space used for more general purpose human-to-human communication (e.g., talking, writing, etc.). For example, users tend to engage with automated assistants 120 to cause one or more tasks to be performed. Even in the context of general search queries, users tend to engage with automated assistants to perform particular types of queries, such as asking about the weather, traffic, transit times, restaurant hours, etc.

Various techniques exist for automatically translating text in one language to another. Various models exists that are configured to receive input in a first language, and provide output in a second language. For example, many web browsers offer the capability of translating web pages to different languages. Additionally, some web services are equipped to receive user input in one language, and to provide output in another language selected by the user.

Accordingly, in various implementations, a translator 138 may be provided, e.g., as part of cloud-based automated assistant components 119 or separately, that may be configured to translate content between various languages. In FIG. 1, translator 138 has access to one or more database 139 that may include various types of data (e.g., dictionaries, trained translation models, etc.) that is usable to translate from one language to another. For example, a first database may facilitate translation from a first language to a second language, and vice versa. A second database may facilitate translation from the first language to a third language, and vice versa. And so on.

In some implementations, translator 138 may implement a statistical machine translation service that translates text from various source languages to a canonical language (e.g., English), and then from the canonical language to a target language. Additionally or alternatively, in some implementations, translator 138 may implement a neural machine translation ("NMT") engine that translates whole sentences or phrases at a time, rather than individual tokens, so that the overall context of textual input can be leveraged.

In some implementations, a conventional NMT model, e.g., already in use by translator 138 to perform general purpose translation, may be augmented (i.e. specially trained) to be better at translating and understanding language used specifically in the domain of human-to-computer dialog. This augmented NMT model will be referred to herein as a "natural language understanding-neural machine translation" ("NLU-NMT") model.

In various implementations, the NLU-NMT model may be trained to map a plurality of semantically-related natural language inputs in one language to one or more canonical translations in another language. In various implementations, the canonical translations may be selected and/or optimized for determining an intent of the speaker by automated assistant 120, so that one or more responsive actions can be performed based on the speaker's intent. Put another way, the canonical translations may be specifically formatted/selected for indicating the intent of the speaker to the automated assistant. While example described herein will primarily relate to multiple speech inputs in one language being speech recognized and mapped to a single canonical translation in another language, this is not meant to be limiting. Techniques described herein may be applicable to unspoken natural language input, such as typed natural language input.

Figure 2:
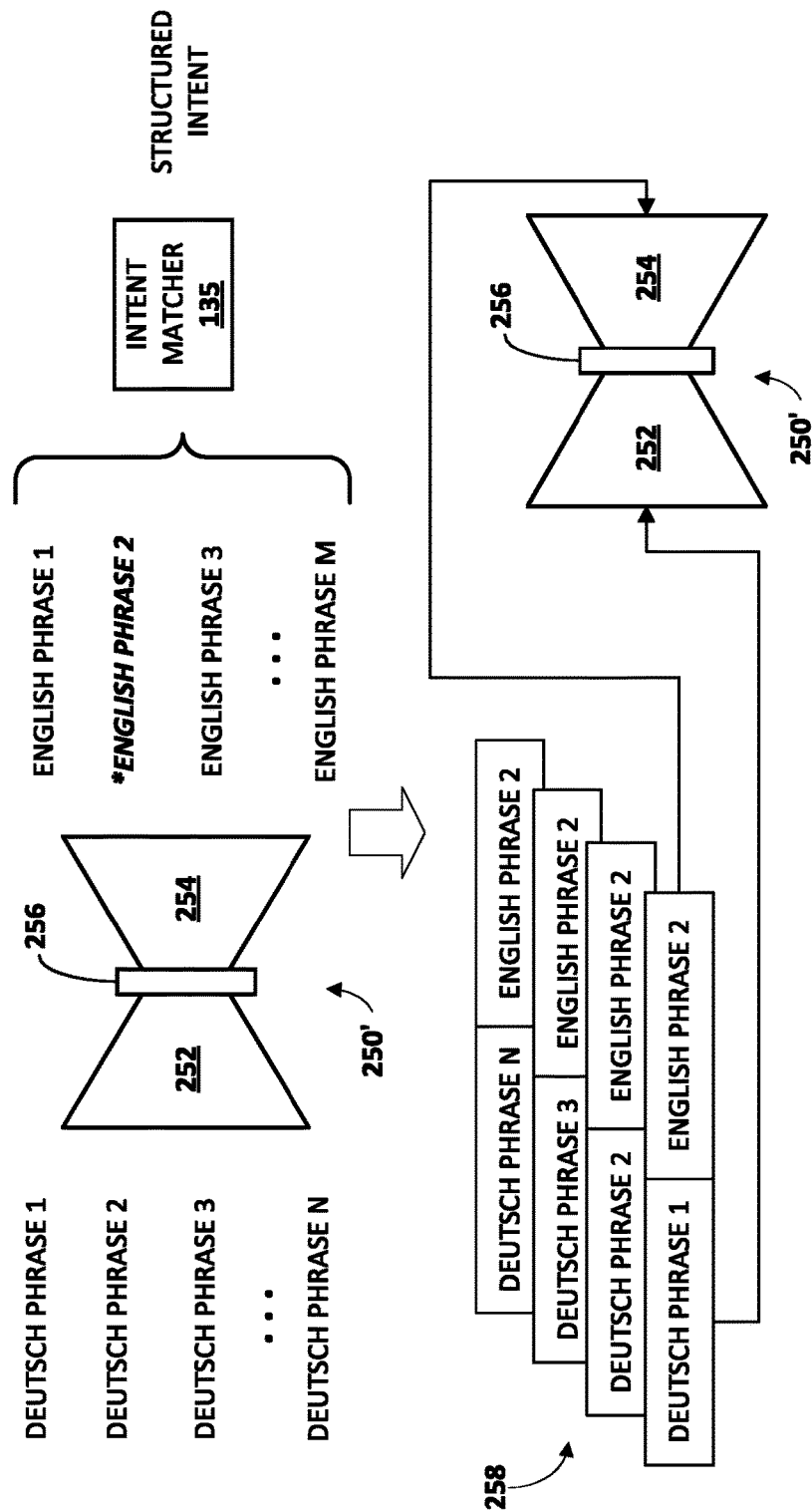
FIG. 2 depicts an example process flow that demonstrates various aspects of the present disclosure, in accordance with various implementations.

FIG. 2 depicts one non-limiting example of how multiple semantically-related phrases in one language may be mapped to a lower number of canonical translations. More specifically, FIG. 2 demonstrates how a plurality of semantically-similar but syntactically-distinct German phrases, which traditionally would translate to a corresponding plurality of semantically-similar but syntactically distinct English phrases, may be mapped to a single canonical English phrase. In FIG. 2 and elsewhere herein, multiple phrases in a first language are mapped to a single canonical phrase in another language. However, this is not meant to be limiting. In various implementations, a plurality of semantically-related phrases in a first language may be mapped to a lower number of canonical translations, including a single canonical translation. Techniques described herein ensure that the canonical translation(s) in the second language vary syntactically from at least some of the plurality of semantically-related phrases in the first language.

In FIG. 2 at top left, a traditional NMT model 250' is depicted. In some implementations, NMT model 250' may take the form of a sequence-to-sequence model such as a memory-equipped neural network. Memory-equipped neural networks may take various forms, such as a recurrent neural network, a long short-term memory ("LSTM") network, a gated recurrent unit ("GRU") network, or any combination thereof. Other sequence-to-sequence models and/or memory-equipped NMT models are contemplated herein. In some implementations, such as that depicted in FIG. 2, NMT model 250' may take the form of an encoder-decoder that includes an encoder portion 252 and a decoder portion 254.

Encoder portion 252 and decoder portion 254 of NMT model 250' may be trained in various ways. In some implementations, portions 252 and 254 may be trained by applying training examples that include phrases in a particular language as input across encoder portion 252 to generate a semantic or reduced-dimensionality embedding 256. This embedding 256 may then be applied as input across decoder portion 254 to generate output. The output may be compared to the input phrase used to generate it. Any difference, or error, between the output and the input phrase may be used to train decoder portion 254 and encoder portion 252, e.g., using techniques such as gradient descent, back propagation, and so forth.

Once encoder portion 252 and decoder portion 254 are trained in a particular language (e.g., by training with a large number of training examples), they may be swapped with other encoder/decoder portions trained in different languages in order to generate the NMT model 250'. In FIG. 2, for instance, encoder portion 252 may be extracted from an encoder-decoder (not depicted) trained in German. Decoder portion 254 may be extracted from another encoder-decoder (not depicted) trained in English. When coupled as depicted in FIG. 2, encoder portion 252 may receive a German phrase as input and generate semantic embedding 256. Decoder portion 254 may map the semantic embedding 256 to an English phrase as output.

As shown at the top of FIG. 2, NMT model 250' may translate N semantically-similar German phrases to M semantically-similar English translations. N and M are positive integers that may or may not be equal to each other. Any of these M semantically-similar English translations may then be analyzed by intent matcher 135 as described previously to identify a structured intent of the user (e.g., intent='set timer' parameter='20 minutes'). However, within the multiple different English translations there may be considerable syntactic variation. Moreover, some of the English translations may be relatively long-tail (i.e. occurring relatively infrequently among all queries), due to some of the corresponding German phrases also being long-tail. Thus, the intents identified based on the various English translations may have various degrees of confidence assigned to them, and in some cases may result in automated assistant 120 requesting disambiguation and/or raising an error.

Accordingly, and as depicted in the middle of FIG. 2, training data 258 may be generated and used to train NMT model 250' to a NLU-NMT model 250 to map multiple syntactically variant phrases in German to a single canonical translation in English. For example, and as depicted in FIG. 2, training data 258 may include multiple training examples. Each training example may take the form of a source phrase (on the left) and a desired, or "canonical," translation (on the right). Notably, the canonical English translation used across multiple training examples may be the same for multiple semantically-similar yet syntactically variant German phrases. In other words, the training data is intended to map the N German phrases to a single (or at least fewer than N and/or M) canonical English translations(s) selected from the M English translations.

In various implementations, the canonical English translation may be selected from the multiple semantically-similar but syntactically-distinct English translations based on various factors, such as its frequency of use (as a translation or simply as a query issued to automated assistant 120 in general). For example, in FIG. 2, English phrase 2 may be selected because it is the phrase used most often by users to convey a particular intent that is shared among the N German phrases and the M English translations thereof. In some implementations, the canonical translation may be selected at random, or may be selected based on its length, e.g., with shorter phrases being preferred over long phrases or vice versa. In some implementations, the canonical phrase may be selected that matches the greatest number of different phrases in the original language. In some implementations, the translation that most closely matches a known command syntax may be selected as the canonical translation.

As shown in the middle of FIG. 2, the N German phrases may be applied as input to encoder portion 252 of NMT model 250' to generate corresponding embeddings 256. These embeddings 256 in turn may be applied as input across decoder portion 254 of NMT model 250 to generate outputs, which initially may include the various English translations. These outputs may be compared to the selected canonical translation—in this example, English phrase 2—to generate errors. These errors are then used to retrain NMT model 250', e.g., using techniques such as gradient descent and/or back propagation, so that it now takes the form of NLU-NMT model 250.

As depicted at the bottom of FIG. 2, this process retrains NMT model 250' to NLU-NMT model 250, which maps multiple semantically-similar but syntactically distinct phrases in a first language (German phrases 1-N) to a single canonical translation in a second language (English phrase 2), or at least to fewer translations than would otherwise be present if techniques described herein were not applied. As a consequence, the canonical translation in the second language varies syntactically from at least some of the plurality of semantically-related phrases in the first language. Moreover, the canonical translation (English phrase 2) can be analyzed by intent matcher 135 to determine a structured intent of the user. Because the canonical translation may be better suited to generate the structure intent then other semantically similar but syntactically-distinct translations, the structured intent may be determined with a relatively high level of confidence.

In some examples, a final performance of NLU NMT model 250 may be improved using multi-task training. For example, embeddings may be generated by an additional encoder that is trained to map semantically-related phrases received in the natively-supported language, English for instance. These semantic embeddings may then be applied as input across decoder portion 254 to generate output. This output may then be used to further train decoder portion 254 as described previously. Intuitively, this multitask training may facilitate mappings between additional semantic embeddings and canonical translations.

In some implementations, e.g., where the NLU NMT model 250 is further trained using multi-task training as described previously, NLU NMT model 250 or an ensemble that includes one or more components thereof may be able to translate from multiple source languages to a single target language. For example, a plurality of encoder portions 252, one for each of a plurality of source languages, may be arranged upstream from a single decoder portion 254. A single decoder portion 254 may suffice in some implementations because it is trained to receive, as input, language-neutral semantic embeddings. In some such implementations, a spoken utterance of a yet-to-be determined language may be applied across each of the plurality of encoder portions 252, e.g., in parallel, to generate a plurality of semantic embeddings. The embeddings in turn may be applied across decoder portion 254 to generate canonical translations. Whichever encoder portion 252 matched the language of the spoken utterance likely will generate the embedding that, when applied across decoder portion 254, has the highest confidence score. This canonical translation may, in some cases, be analyzed to identify the speaker's intent.

Additionally or alternatively, in some implementations, a single NLU NMT model 250 may be used to process utterances in multiple languages, and/or to translate between multiple languages. In some implementations of a multi-language NLU NMT model 250, encoder portion 252 may be trained to receive as one or more inputs, in addition to data indicative of the spoken utterance (e.g., speech recognition output), one or more signals indicative of the language spoken by the speaker. These signals may be obtained from various sources, such as a position coordinate sensor (e.g., GPS) of a device carried by the speaker, the speaker's preferences, etc. In some implementations, these signals may propagate through the NLU NMT model 250 in a manner that effectively "selects" or "identifies" the language spoken.

In some implementations, NLU NMT model 250 may effectively be trained to perform "zero-shot" translation between a previously un-encountered source language and a target language. For example, a single NLU NMT model 250 may be trained in multiple languages, such that a variety of semantically-related phrases in multiple language may all map to the same canonical translation. For example, encoder portion 252 of NLU NMT model 250 may be shared over different source languages. Similarly, decoder portion 254 may be shared over different target languages. In some such implementations, a vocabulary of size V (V being a positive integer) may be shared across the different languages. In some such implementations, the vocabulary may be a shared word piece vocabulary. A "word piece vocabulary" as used herein refers to a vocabulary containing sub word units (e.g., phonemes) which may be assembled into words.

In some implementations multiple word piece vocabularies of a fixed size V may be generated in each of multiple languages. In some such implementations, these multiple vocabularies may be merged to generate a new, single vocabulary of size V. For example, a highest occurring word in each generated vocabulary may be sequentially selected until a size of the new vocabulary reaches V. Optionally, duplicated words may be removed from the generated vocabulary until the size of the new vocabulary reaches V. For example, when generating a vocabulary that merges English words with German words, the system may de-duplicate the English word "die" with the German article "die."

In some implementations, the merged vocabulary may include a probability distribution of words across different languages. For example, the merged vocabulary may include a uniform distribution such that for n (n being a positive integer) different languages, the merged vocabulary includes V/n words in each language. In other cases the merged vocabulary may include a data-driven distribution of words across the different languages, e.g., the generated vocabulary may include different numbers of words in each language In various implementations, model outputs may be generated that are translations of received model inputs into a single target language. In these cases the multi-language NLU NMT 250 may include an encoder portion 252 that is shared over different source languages, a decoder portion 254 for the single target language, and a vocabulary that is shared across the different source languages. In other cases, model outputs may be generated that are translations of received model inputs in a single source language into multiple target languages.

Figure 3:
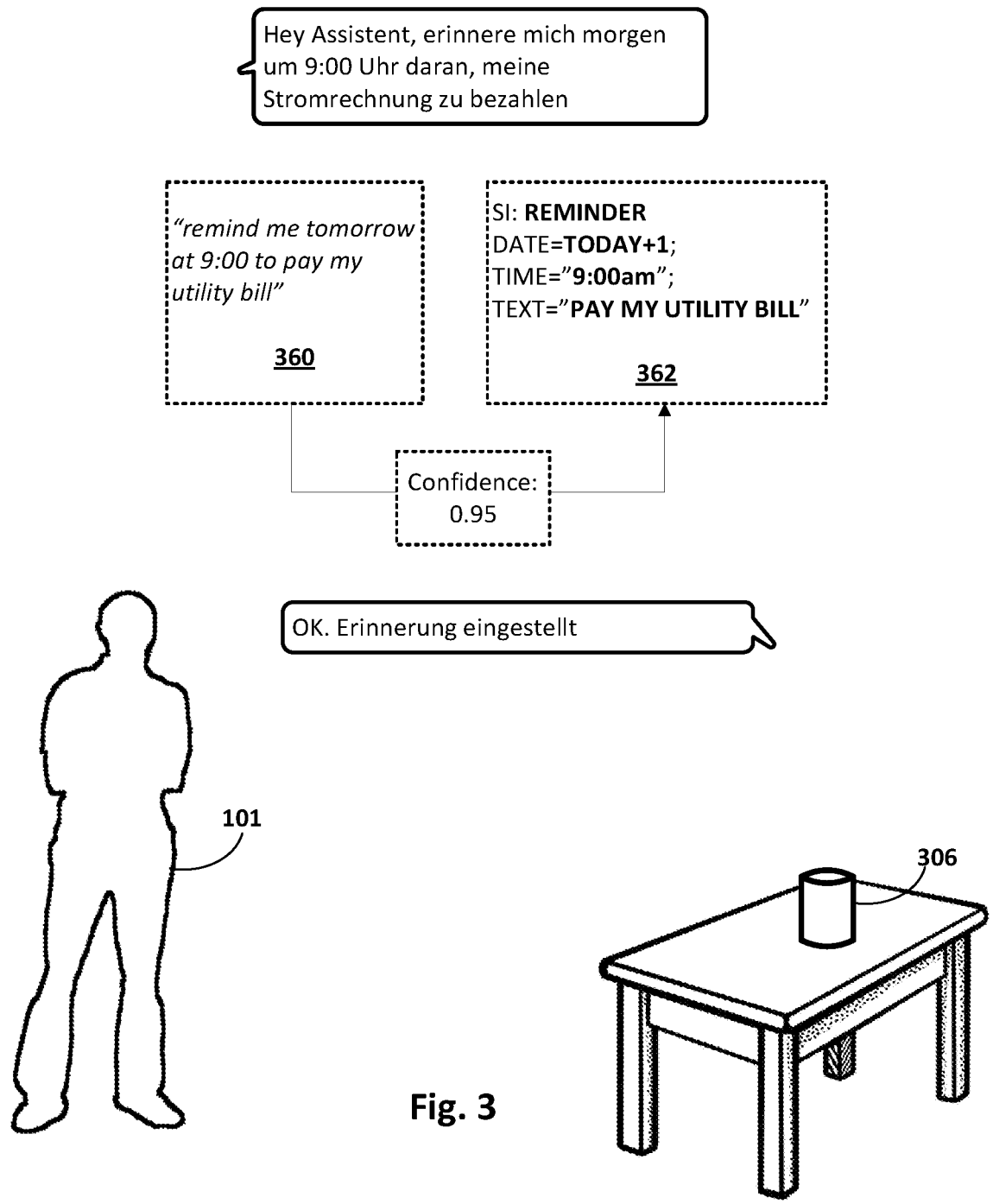
FIGS. 3, 4, 5A, and 5B depict example dialogs between a user and an automated assistant, in accordance with various implementations.

FIGS. 3-5A depict examples of different ways a German-speaking user 101 may convey an intent to set a reminder the next morning at 9 AM to pay a utility bill. In FIG. 3, user 101 converses with automated assistant 120 by way of a stand-alone interactive speaker 306 that includes components of client device 106, including automated assistant client 118. In FIG. 3, user 101 invokes automated assistant by saying "Hey Assistant." Then, user 101 says, "erinnere mich morgen um 9:00 Uhr daran, meine Stromrechnung zu bezahlen," which translates in English to "remind me tomorrow at 9:00 to pay my utility bill." This translation 360 may be used, e.g., by intent matcher 135, to determine a structured intent 362 that includes an intent of "reminder," a date of "today+1," a time of "9:00 AM," and text of "pay my utility bill."

In this example, a relatively high level of confidence (0.95) is assigned to structured intent 362. This may be because, for instance, the translation matches a command syntax—"remind me <date> at <time> to <reminder text>"—that is used relatively frequently by users to set future reminders using automated assistant 120. However, there may be other commands that, while usable to achieve the same outcome (i.e. the same structured intent), generate somewhat smaller confidences, e.g., because those commands are "long tail," encountered relatively infrequently by automated assistant 120, and/or are not as straightforward to parse and process. At any rate, because the confidence score satisfies some criteria, such as a minimum threshold, automated assistant 120 may take action and respond, "OK, Erinnerung eingestellt," which translates in English to "OK, reminder set."

Figure 4:
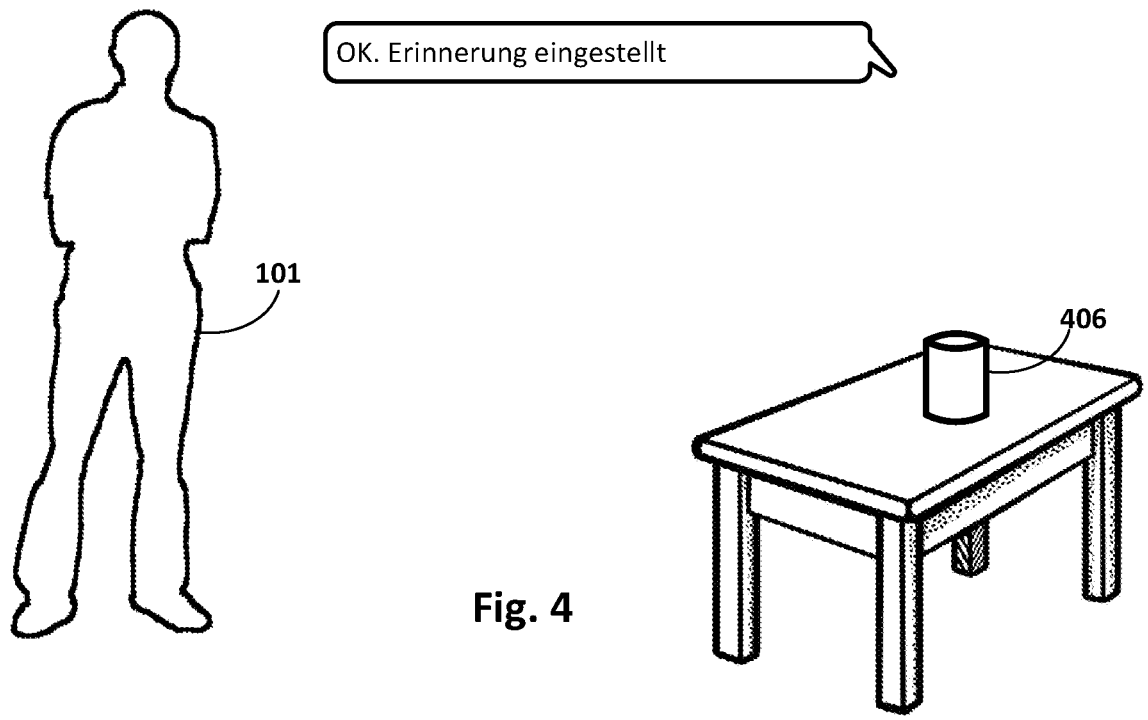

In FIG. 4, the same user 101 attempts to set the same reminder. However, this time user 101 says, after invoking automated assistant 120, "Lassen Sie mich nicht vergessen, dass ich morgen um 9 Uhr meine Stromrechnung bezahlen muss." The English translation 360 of this phrase is "don't let me forget that I need to pay my utility bill tomorrow at 9 am." This English translation may still be a relatively common way to request that a reminder be set, and/or may be relatively easily parsed/processed by automated assistant 120 to generate the same structured intent 362. However, it may receive a slightly lower confidence score, 0.85, than the previous example because the translation is not as frequently encountered and/or as easily understood by automated assistant 120 as the previous example. Nonetheless, so long as the confidence score satisfies some threshold (e.g., 0.75, 0.8, etc.), automated assistant 120 may still respond with "OK, Erinnerung eingestellt."

Figure 5A:
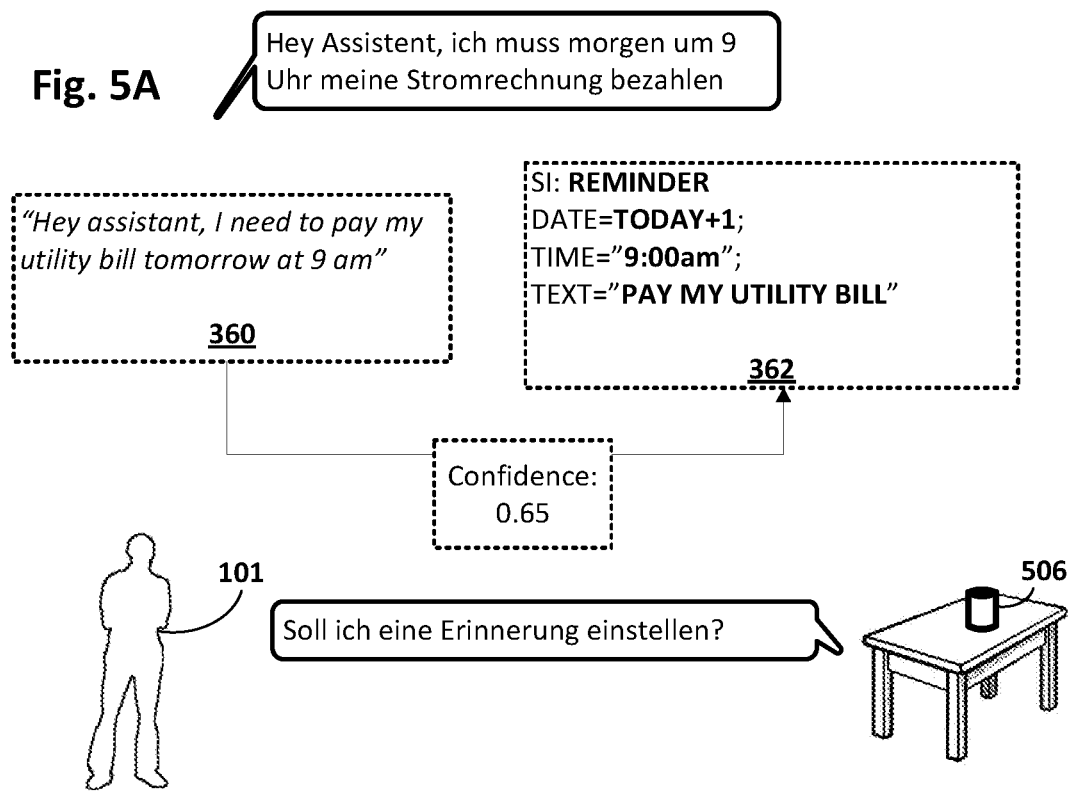

FIG. 5A demonstrates an example in which a query issued by user 101 is so unconventional, long tail, and/or otherwise difficult for automated assistant 120 to process that automated assistant 120 seeks disambiguation. In particular, user 101 states, after invoking automated assistant 120, "ich muss morgen um 9 Uhr meine Stromrechnung bezahlen." This translates in English to "I need to pay my utility bill tomorrow at 9 am." Notably this is a statement, not a question, and is not similar to a typical command syntax for causing automated assistant 120 to set a reminder. Rather, it is more of a statement that requires the listener to infer that they need to take action, namely, setting a reminder. Accordingly, while structured intent 362 may or may not still be identified by automated assistant 120, it may be identified with a relatively low confidence score (0.65) that fails to satisfy some threshold. Consequently, rather than responding to the user's request, automated assistant 120 asks, "Soil ich eine Erinnerung einstellen?," which translates in English to "Should I set a reminder?"

Figure 5B:
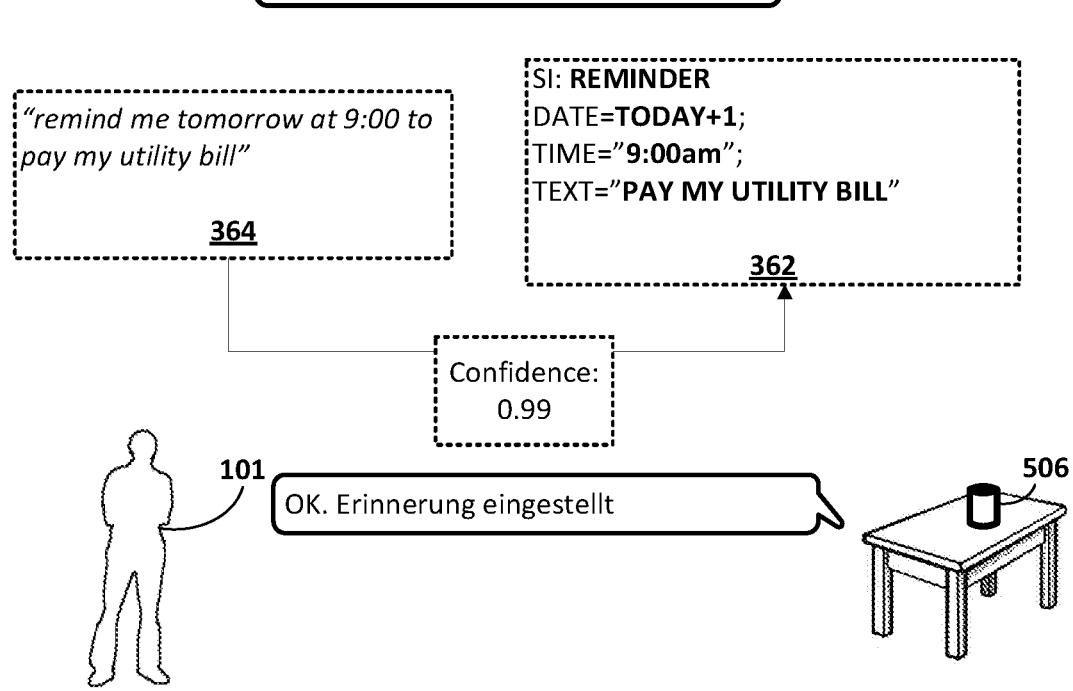

However, if techniques described herein are applied to retrain a NMT model (e.g., 250'→250) as described previously, it may be possible to respond to any of the user's requests in FIGS. 3, 4, and 5A with a uniform amount of confidence. In some implementations, each of the user's requests, which are semantically similar to each other but syntactically distinct, may be mapped to a single canonical translation. FIG. 5B demonstrates an example of how this might work.

In FIG. 5B, similar to FIG. 5A, user 101 once again states, after invoking automated assistant 120, "ich muss morgen um 9 Uhr meine Stromrechnung bezahlen." However, instead of being translated directly to "I need to pay my utility bill tomorrow at 9 am," as was the case in FIG. 5A, this statement is instead translated to the canonical translation 364, "remind me tomorrow at 9:00 to pay my utility bill," similar to FIG. 3. As shown in FIG. 5B, this canonical translation 364 can be used to generate a structured intent 362 with a very high level of confidence, 0.99 in FIG. 5B. Consequently, automated assistant 120 sets the reminder and responds as before.

In various implementations, the various arguments and/or parameters contained in a user's query may be preserved, e.g., separately from the command syntax, using various machine translation alignment techniques, such as techniques that employ statistical models, hidden Markov model alignment, heuristic word association statistics such as log-likelihood ratio, hierarchical phrase alignment, etc.

FIG. 6 is a flowchart illustrating an example method 600 for utilizing an NMT model trained using techniques described herein. For convenience, the operations of the flow chart are described with reference to a system that performs the operations. This system may include various components of various computer systems, such as one or more components of computing systems that implement automated assistant 120. Moreover, while operations of method 600 are shown in a particular order, this is not meant to be limiting. One or more operations may be reordered, omitted or added.

At block 602, the system may capture a spoken utterance at a microphone to generate audio data. In various implementations, the spoken utterance may be spoken in a first language, such as German in the examples of FIGS. 2-5B. At block 604, the system, e.g., by way of speech capture/ TT/STT module 114 and/or STT module 117, may perform speech recognition processing on the audio data to generate speech-recognition output. This speech recognition output may take the form of text representing the speech, or another form such as an embedding.

At block 606, the system may apply the speech-recognition output as input across a trained machine translation model, e.g., NLU-NMT model 250, to generate output. In various implementations, the output may be indicative of a canonical translation of the speech-recognition output from the first language to a second language. For example, NLU-NMT model 250 may be a sequence-to-sequence model that generates, sequentially, the canonical translation of the speech recognition output. As noted previously, the machine translation model may be trained to map a plurality of semantically-related phrases in the first language (that ultimately yield the same intent) to the same canonical translation. Consequently, the canonical translation may vary syntactically from at least some of the plurality of semantically-related phrases.

At block 608, the system may determine an intent conveyed by the spoken utterance based on the canonical translation. In some implementations, the intent may be determined based on a direct mapping between the canonical translation and the intent. Such a mapping may be generated manually in some implementations. Additionally or alternatively, in some implementations, determining the intent may include performing natural language processing on the canonical translation to determine the intent, e.g., where no predefined mapping exists. At block 610, the system may perform one or more responsive actions based on the intent. Responsive actions may include, but are not limited to, actions often taken by automated assistants, such as setting reminders, setting alarms, operating smart appliances (e.g., lights, thermostats, etc.), playing media, performing searches, etc.

FIG. 7 is a flowchart illustrating an example method 700 for training (or retraining) an NMT model trained using techniques described herein. For convenience, the operations of the flow chart are described with reference to a system that performs the operations. This system may include various components of various computer systems, such as one or more components of computing systems that implement automated assistant 120. Moreover, while operations of method 700 are shown in a particular order, this is not meant to be limiting. One or more operations may be reordered, omitted or added.

At block 702, the system may identify a plurality of semantically-related phrases in a first language, such as the N German phrases in FIG. 2. At block 704, the system may identify a plurality of translations of the plurality of semantically-related phrases in a second language, such as the M English translations in FIG. 2.

At block 706, the system may generate a canonical translation in the second language, such as English phrase 2 in FIG. 2. The canonical translation may correspond to the plurality of translations (e.g., M English phrases in FIG. 2) of the plurality of semantically-related phrases (e.g., N German phrases in FIG. 2). At block 708, the system may generate training data (e.g., 258 in FIG. 2) based on the plurality of semantically-related phrases and the canonical translation. At block 710, the system may train the machine translation model, e.g., NMT model 250', using the training data. Upon being trained into NLU-NMT model 250, the machine translation model may map the plurality of semantically-related phrases in the first language to the canonical translation in the second language.

Figure 8:
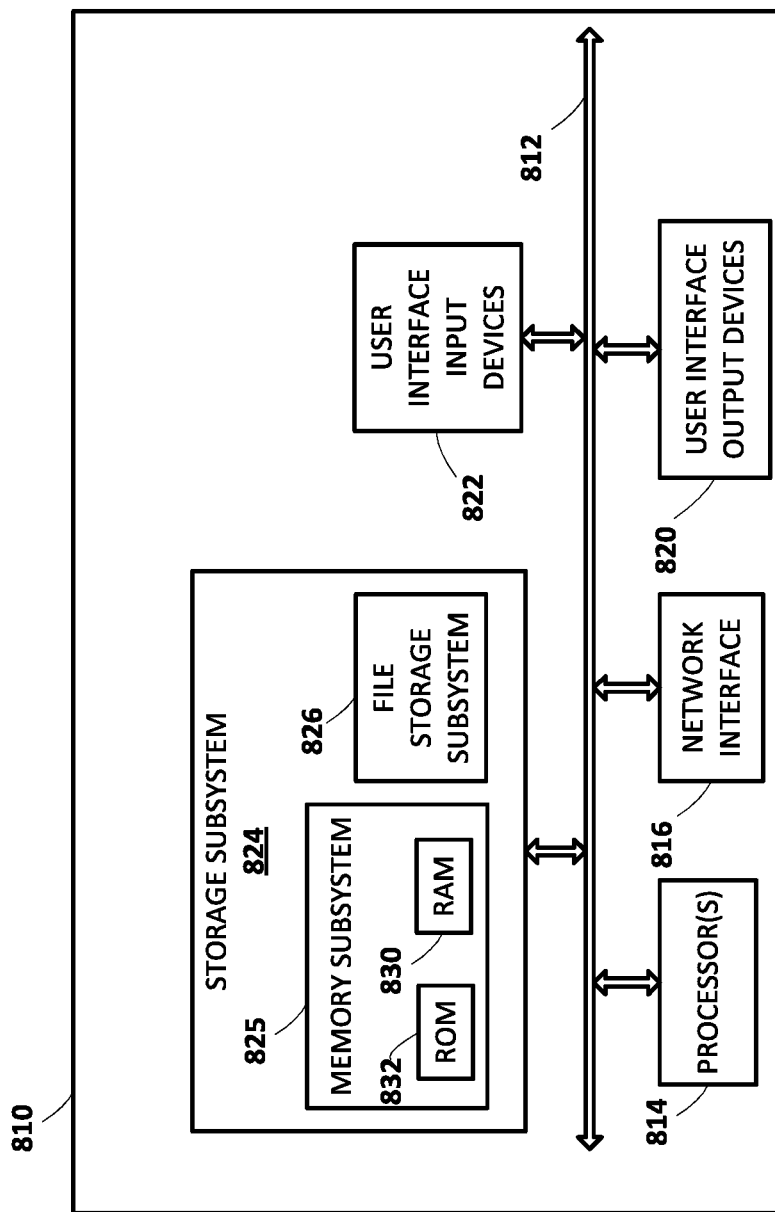
FIG. 8 illustrates an example architecture of a computing device.

FIG. 8 is a block diagram of an example computing device 810 that may optionally be utilized to perform one or more aspects of techniques described herein. In some implementations, one or more of a client computing device, user-controlled resources engine 130, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 6 and 7, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processers, comprising:
capturing a spoken utterance at a microphone to generate audio data, wherein the spoken utterance is spoken in a first language;
performing speech recognition processing on the audio data to generate speech-recognition output;
applying the speech-recognition output as input across a trained encoder-decoder machine translation model to generate output, wherein the output comprises a canonical second language translation of the speech-recognition output from the first language;
determining an intent conveyed by the spoken utterance based on the canonical second language translation; and
performing one or more responsive actions based on the intent;
wherein the encoder-decoder machine translation model was trained previously to map a plurality of syntactically-distinct but semantically-similar phrases in the first language to the same canonical second language translation, wherein the encoder-decoder machine translation model was trained previously by:
processing the plurality of phrases in the first language based on the encoder-decoder machine translation model to generate a plurality of syntactically-distinct but semantically-similar second language translations; and
comparing the plurality of syntactically-distinct but semantically-similar second language translations to the canonical second language translation to generate corresponding errors, whereby the encoder-decoder machine translation model was trained previously based on the corresponding errors.

2. The method of claim 1, wherein a decoder portion of the encoder-decoder machine translation model is trained to map one or more semantic embeddings representing the plurality of syntactically-different but semantically-related phrases in the first language to the same canonical translation.

3. The method of claim 1, wherein an encoder portion of the encoder-decoder machine translation model is trained to map the syntactically-different but plurality of semantically-related phrases in the first language to a lower number of semantic embeddings.

4. The method of claim 1, further comprising:
capturing another spoken utterance at the same microphone or a different microphone to generate additional audio data, wherein the another spoken utterance is spoken in a third language;

performing speech recognition processing on the additional audio data to generate additional speech-recognition output;

applying the additional speech-recognition output as input across the trained machine translation model to generate additional output, wherein the additional output comprises the canonical second language translation of the speech-recognized text;

determining an additional intent conveyed by the another spoken utterance based on the canonical second language translation; and performing one or more additional responsive actions based on the additional intent;

wherein the encoder-decoder machine translation model is trained to map a plurality of semantically-related phrases in the third language to the same canonical second language translation, wherein the canonical second language translation varies syntactically from at least some of the plurality of semantically-related phrases in the third language.

5. The method of claim 1, wherein the trained encoder-decoder machine translation model includes a word piece vocabulary that is shared across multiple languages.

6. The method of claim 1, wherein determining the intent comprises performing natural language processing on the canonical second language translation to determine the intent.

7. A method of training encoder-decoder machine translation model to map a plurality of syntactically-distinct but semantically-similar phrases in a first language to a single canonical second language translation, comprising:

processing the plurality of syntactically-distinct but semantically-similar phrases in the first language based on the encoder-decoder machine translation model to generate a plurality of syntactically-distinct but semantically-similar second language translations;

comparing the plurality of syntactically-distinct but semantically-similar second language translations to the single canonical second language translation to generate corresponding errors; and training the encoder-decoder machine translation model based on the corresponding errors.

8. The method of claim 7, wherein the training comprises training a decoder portion of the encoder-decoder machine translation model to map one or more semantic embeddings representing the plurality of syntactically-distinct but semantically-related phrases in the first language to the single canonical second language translation.

9. The method of claim 7, wherein the training comprises training an encoder portion of the encoder-decoder machine translation model to map the plurality of syntactically-distinct but semantically-related phrases in the first language to a lower number of semantic embeddings.

10. A system comprising one or more processors and memory storing instructions that, in response to execution of the instructions by the one or more processors, cause the one or more processors to:

capture a spoken utterance at a microphone to generate audio data, wherein the spoken utterance is spoken in a first language;

perform speech recognition processing on the audio data to generate speech-recognition output;

apply the speech-recognition output as input across a trained encoder-decoder machine translation model to generate output, wherein the output comprises a canonical second language translation of the speech-recognition output from the first language;

determine an intent conveyed by the spoken utterance based on the canonical second language translation; and perform one or more responsive actions based on the intent;

wherein the encoder-decoder machine translation model was trained previously to map a plurality of syntactically-distinct but semantically-similar phrases in the first language to the same canonical second language translation, wherein the encoder-decoder machine translation model was trained previously by:

processing the plurality of phrases in the first language based on the encoder-decoder machine translation model to generate a plurality of syntactically-distinct but semantically-similar second language translations; and comparing the plurality of syntactically-distinct but semantically-similar second language translations to the canonical second language translation to generate corresponding errors, whereby the encoder-decoder machine translation model was trained previously based on the corresponding errors.

11. The system of claim 10, wherein a decoder portion of the encoder-decoder machine translation model is trained to map one or more semantic embeddings representing the plurality of syntactically-different but semantically-related phrases in the first language to the same canonical second language translation.

12. The system of claim 10, wherein an encoder portion of the encoder-decoder machine translation model is trained to map the plurality of syntactically-different but semantically-related phrases in the first language to a lower number of semantic embeddings.

13. The system of claim 10, wherein the intent is determined based on a mapping between the canonical second language translation and the intent.

* * * * *